United States Patent [19]

Boehm

[11] Patent Number: 5,070,287
[45] Date of Patent: Dec. 3, 1991

[54] METHOD FOR A NUMERICAL POSITIONING CONTROL SYSTEM

[75] Inventor: Manfred Boehm, Pretzfeld, Fed. Rep. of Germany

[73] Assignee: Siemens Aktiengesellschaft, Berlin & Munich, Fed. Rep. of Germany

[21] Appl. No.: 589,340

[22] Filed: Sep. 27, 1990

[30] Foreign Application Priority Data

Sep. 27, 1989 [EP] European Pat. Off. ........ 89117901.2

[51] Int. Cl.$^5$ .......................................... G05B 19/407
[52] U.S. Cl. ..................................... 318/569; 318/615; 318/616; 318/568.1; 364/474.30; 395/1
[58] Field of Search ................................. 318/560–646; 364/513, 167, 168, 169, 474.12, 474.18, 474.19, 474.23, 474.24, 474.30, 474.28, 474.29, 474.31, 474.32

[56] References Cited

U.S. PATENT DOCUMENTS

| 3,870,939 | 3/1975 | Robert ................................. 318/611 |
| 4,554,497 | 11/1985 | Nozawa et al. ................. 318/616 X |
| 4,603,286 | 7/1986 | Sakano ................................ 318/615 |
| 4,683,543 | 7/1987 | Hirasawa et al. ................... 364/513 |
| 4,757,457 | 12/1988 | Matsumoto ........................ 364/474 |
| 4,815,007 | 3/1989 | Sakai et al. ......................... 364/513 |
| 4,864,205 | 9/1989 | Fisher et al. ....................... 318/568 |

FOREIGN PATENT DOCUMENTS 2643148  3/1978  Fed. Rep. of Germany .
3545795  7/1986  Fed. Rep. of Germany .

Primary Examiner—Paul Ip
Attorney, Agent, or Firm—Kenyon & Kenyon

[57]  ABSTRACT

A numerical positioning control system renders possible clocked-synchronous acceleration, and deceleration operations for motorized driving systems (A). A specified target point (PO), which for example can be the end point of a path section, can be reached with a predetermined final velocity ($V_{END}$) exactly at a calibration time (T) of the numerical control. At least two acceleration values ($a_1$,a) are defined for the acceleration, and braking operation, whereby the time which is required for the entire acceleration operation is exactly an integral multiple of the calibration time (T) of the numerical control. To avoid sudden changes in acceleration, a rate-of-change limiter is implemented according to the principle of discrete convolution.

12 Claims, 3 Drawing Sheets

METHOD FOR A NUMERICAL POSITIONING CONTROL SYSTEM

BACKGROUND OF THE INVENTION

The present invention relates generally to numerical control driving systems, and more particularly to those systems that specify control values for discrete calibration intervals.

In many technical applications of driving systems, as used for example in conveying machinery, elevators, machine tools, industrial robots, rolling-mill installations or vehicle control systems, it is necessary to generate a sequence of movements in accordance with defined paths. In numerically controlled driving systems, a sequence of position settings is preselected in one or more coordinates over a specific time cycle. The control system must calculate a precise acceleration and velocity profile for the transition between two position settings and transmit this profile to the driving system. The goal is to use the permissible traversing velocities and the available driving power as efficiently as possible without distorting the contour through limiting effects or overshooting.

Because numerical control system preselect cycle time, any change in, or stipulation of acceleration settings or velocity settings can only occur at discrete times. Therefore, inaccuracies within the range of one clock interval must be avoided.

DE-PS 26 43 148 describes a method of numerically controlling an element of a machine tool along a specified path of motion, whereby in each calibration interval, the discrete acceleration values, the discrete velocity values and the path increments to be travelled are calculated by a computer. A braking command dependent on acceleration, velocity and residual path is then generated by a processor for a complete calibration interval during which the brake is applied. The braking command is then interrupted for at least one calibration interval, provided that the ideal braking parabola is not exceeded. With this method, however, it is not possible to reach a specified target point exactly at the beginning of a calibration interval.

The goal of the present invention is to develop numerical positioning control systems in a way which will allow drive values to be specified at a calibration time and a desired target point to be reached with a desired final velocity exactly at the beginning of a calibration interval.

SUMMARY OF THE INVENTION

The present invention achieves this goal by developing a method for such numerical positioners that determines an approach acceleration for a first calibration time $((k-1) \cdot T)$, which occurs before $(t_{MIN})$, wherein $(t_{MIN})$ is a time required to reach the target point (PO) with the final velocity $(v_{END})$ when employing a maximum acceleration $(a_{MAX})$, and then applies the approach acceleration $(a_1)$ to the driving system up to the second calibration time $(k \cdot T)$. Next the method determines a final acceleration for the second calibration time $(k \cdot T)$ and applies the final acceleration to the driving system until the target point (PO) is reached. Both the approach acceleration $(a_1)$ and the final acceleration are selected to reach the target point (PO) with the final velocity $(v_{END})$ exactly at an integral multiple of the calibration time $(n \cdot T)$.

However, the goal of the invention is also able to be achieved by determining the approach acceleration as described above. Then, one determines an additional approach acceleration at each additional calibration time, and applies the additional approach acceleration at the appropriate calibration time to the driving system. Each additional approach acceleration is selected so that at a additional calibration time, the remaining residual path could be covered with an acceleration during a time span which corresponds to an integral multiple of the calibration time.

With this solution to the objective, it is possible to specify a new target point during a braking phase as well, for example, since the acceleration is calculated anew for each calibration interval. Thus, one can allow for one new target point at a time.

DETAILED DESCRIPTION

Figure 1:
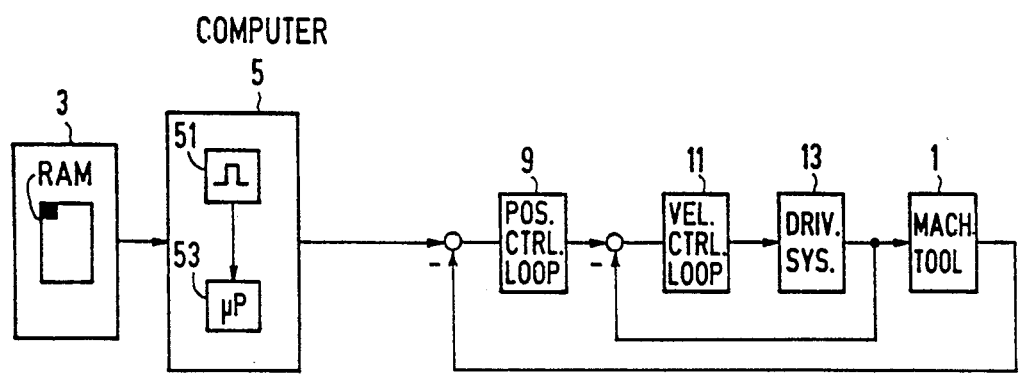
FIG 1 illustrates the structure of a computer driven control of a numerically controlled machine tool.

FIG. 1 shows the structure of a computer controlling a numerically controlled machine tool 1. The information stored, for example, in a read-write RAM memory is entered from an input device 3 into a computer 5. The computer 5 decodes the input information, makes interpolations, performs calculations to determine the position settings for the position control loop L, performs velocity calculations and takes over the sequencing control. The computer 5 contains a clock generator 51 to produce a clock signal. A defined number of clock pulses of the clock generator 51 forms a computing cycle time or calibration time T. During a calibration time T, new position settings must be calculated for each position control loop. The computer 5 outputs position settings to the position control loop 9. Each position control loop 9 compares the position setting to the actual position of the machine tool 1 and controls a velocity control loop 11 for the driving system(s) 13 of the respective machine axis. For every calibration time, a computing device 53 of the computer 5 supplies an acceleration- and velocity-proportional path increment, which is transmitted to the individual controlled machine axes by means of an appropriate interpolation.

Figure 2:
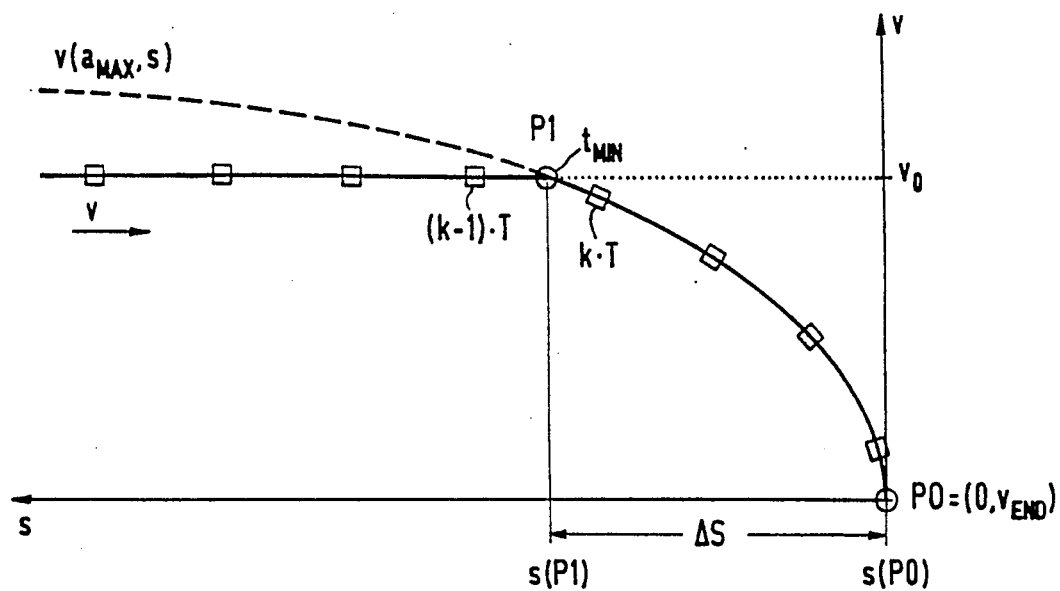
FIG. 2 is a diagram of the velocity profile across the path with maximum acceleration.

FIG. 2 illustrates a velocity-path diagram for the braking operation of a driving system. The driving system could propel, for example, the leading spindle and therefore also a sliding carriage of the machine tool 1. As the velocity arrow with the velocity v shows, the sliding carriage moves in the direction of diminishing values of the position S. First, the sliding carriage is moved with the constant velocity $v_0$. At the point PO, i.e. the origin of the coordinate system, the sliding carriage should have zero acceleration and final velocity $v_{END}$. The constant traversing velocity $v_0$ must be reduced, so that the target point s(PO) is reached with final velocity $v_{END}$. For the maximum deceleration $a_{MAX}$ achievable by the driving system, the velocity profile terminating at $v_{END}$ is the parabola shown in FIG. 2. This parabola intersects the straight line with the constant velocity $v_0$ at the point P1 identified by a circle. To reach the target point P0 with the final velocity $v_{END}$, one would have to decelerate exactly at this point P1 with the acceleration $a_{MAX}$. ("Acceleration" is used in its general sense, therefore to include "braking" or "decelerating" as well).

The calibration times, which correspond to the computation cycle time of the numerical control of the computer 5, are shown in the diagram of FIG. 2. As is apparent, the intersection point of the parabola with the acceleration $a_{MAX}$ and of the straight line with the constant velocity $v_0$ lies between the calibration times $(k-1)T$ and $k \cdot T$. However, the numerical control can specify velocity and accelerating settings at calibration times only. Therefore, if there is already a deceleration at the calibration time $(k-1) \cdot T$ with the acceleration $a_{MAX}$, then the traversing motion of the sliding carriage will reach the final velocity $v_{END}$ before the point P0. If the acceleration $a_{MAX}$ starts at the calibration time $k \cdot T$, then the sliding carriage will drive past the point P0.

Now, it would be conceivable to decelerate already at the calibration time $(k-1) \cdot T$ with an acceleration a, which is less than the maximum acceleration $a_{MAX}$, and to select this acceleration, so that the point P0 would be accurately reached. However, this measure would leave up to chance whether the target point P0 would be reached at a calibration time T, so that for the subsequent positioning, and traversing operation, one is again confronted with the same problems that occurred when the first deceleration was introduced.

The method described in greater detail in the following guarantees that an acceleration or deceleration of a driving system introduced at one calibration time reaches a specified target point with a defined final velocity exactly at another calibration time. For this purpose, at least two acceleration values are calculated by the computer 5 of a numerical control system, in accordance with simple kinematic relations and with a minimal computation, and are transmitted to the numerical control system. The necessary equations are derived in the following based on FIG. 3.

Figure 3:
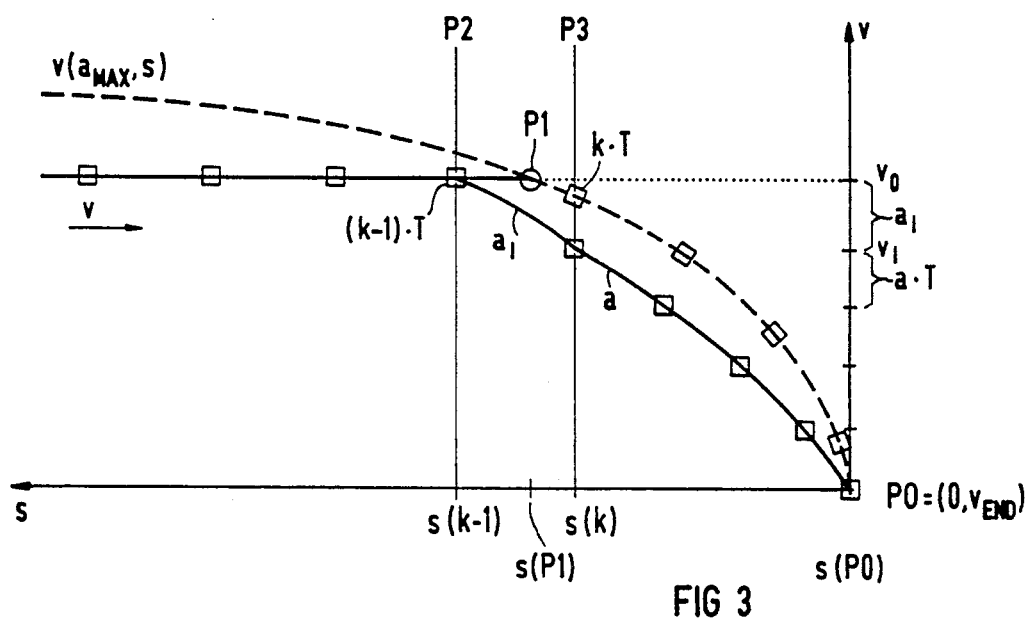
FIG. 3 is a diagram of the velocity profile across the path with the acceleration profiles adapted to the clock pulses.

FIG. 3 depicts a velocity-path diagram with the acceleration $a_{MAX}$ in the form of a parabola described in connection with FIG. 2, but drawn as a dotted line. Another part of a parabola with the acceleration $a_1$ is drawn in between the points P2 and P3, and a part of another parabola with the acceleration a between the points P3 and P0.

A transition to the braking parabola with the acceleration a is only attainable at a calibration time T. The following applies:

$$|a_1| < |a_{MAX}| \qquad \text{Equation 1}$$

The approach velocity $v_1$ at point P3 is the velocity that one is supposed to brake with the acceleration a and can be determined by:

$$v_1 = v_0 + a_1 \cdot T \qquad \text{Equation 2}$$

The accelerations $a_1$ and a are to be selected so that the target point P0 is reached after an integral number of calibration intervals. The time at which the braking operation is introduced with the acceleration $a_1$ is $t = (k-1) \cdot T$.

For the path length between the point P2 and P3, one obtains $$s(k-1) - s(k) = v_0 \cdot T + \tfrac{1}{2} a_1 \cdot T^2 \qquad \text{Equation 3}$$

The residual path s(k) to be covered with the acceleration a can be determined from this equation as a function of the approach acceleration $a_1$. This residual path s(k) is exactly that path, in which the approach velocity $v_1$ according to equation 2 must be decelerated to the final velocity $v_{END}$ in the time t, which corresponds to an integral multiple J of the calibration time T. Therefore, it applies that:

$$t = J \cdot T \qquad \text{Equation 4}$$

where J is an integer. For the residual path s(k) to be covered with the acceleration a, the so-called time-free equation applies for uniformly accelerated motions with the initial velocity:

$$s(k) = (v_1^2 - v_{END}^2)/(2a) \qquad \text{Equation 5}$$

Using equations 2 and 5, the residual path s(k) becomes:

$$s(k) = ((v_0 + a_1 \cdot T)^2 - v_{END}^2)/(2a) \qquad \text{Equation 6}$$

$$s(k) = ((v_0 + a_1 \cdot T) + v_{END}) \cdot ((v_0 + a_1 \cdot T) - v_{END})/(2a) \quad \text{Equation 7}$$

The following equation applies for the approach velocity $v_1$:

$$v_1 = J \cdot T \cdot a \qquad \text{Equation 8}$$

By comparing the duration of the continuous braking operation with the acceleration $a_{MAX}$, J can be properly selected according to the following:

$$J = integer\,((v_1 - v_{END})/(a_{MAX} \cdot T)) + C \qquad \text{Equation 9}$$

where $C = 0,1,2$, so that the braking operation including the approach interval between the points P2 and P3 would last for a maximum of three intervals longer than a continuous braking operation with a maximum deceleration.

$$a = (v_1 - v_{END})/(J \cdot T) \qquad \text{Equation 10}$$

substituting equation 2

$$a = (v_0 + a_1 \cdot T - v_{END})/(J \cdot T) \qquad \text{Equation 11}$$

Using equations 7 and 11, one obtains $$s(k) = \tfrac{1}{2} J \cdot T \cdot (v_0 + a_1 \cdot T + v_{END}) \qquad \text{Equation 12}$$

If one equates equation 3 and equation 12, then one obtains for the approach acceleration:

$$a_1 = \frac{2\,s(k-1) - (J+2) \cdot T \cdot v_0 - J \cdot T \cdot v_{END}}{(J+1) \cdot T^2} \qquad \text{Equation 13}$$

If, then, the value of J is determined according to equation 9, the approach acceleration $a_1$ can be calculated with minimal computation according to equation 13 (Note: equation 13 only shows a quadratic term as the most comprehensive computing operation).

Figure 4:
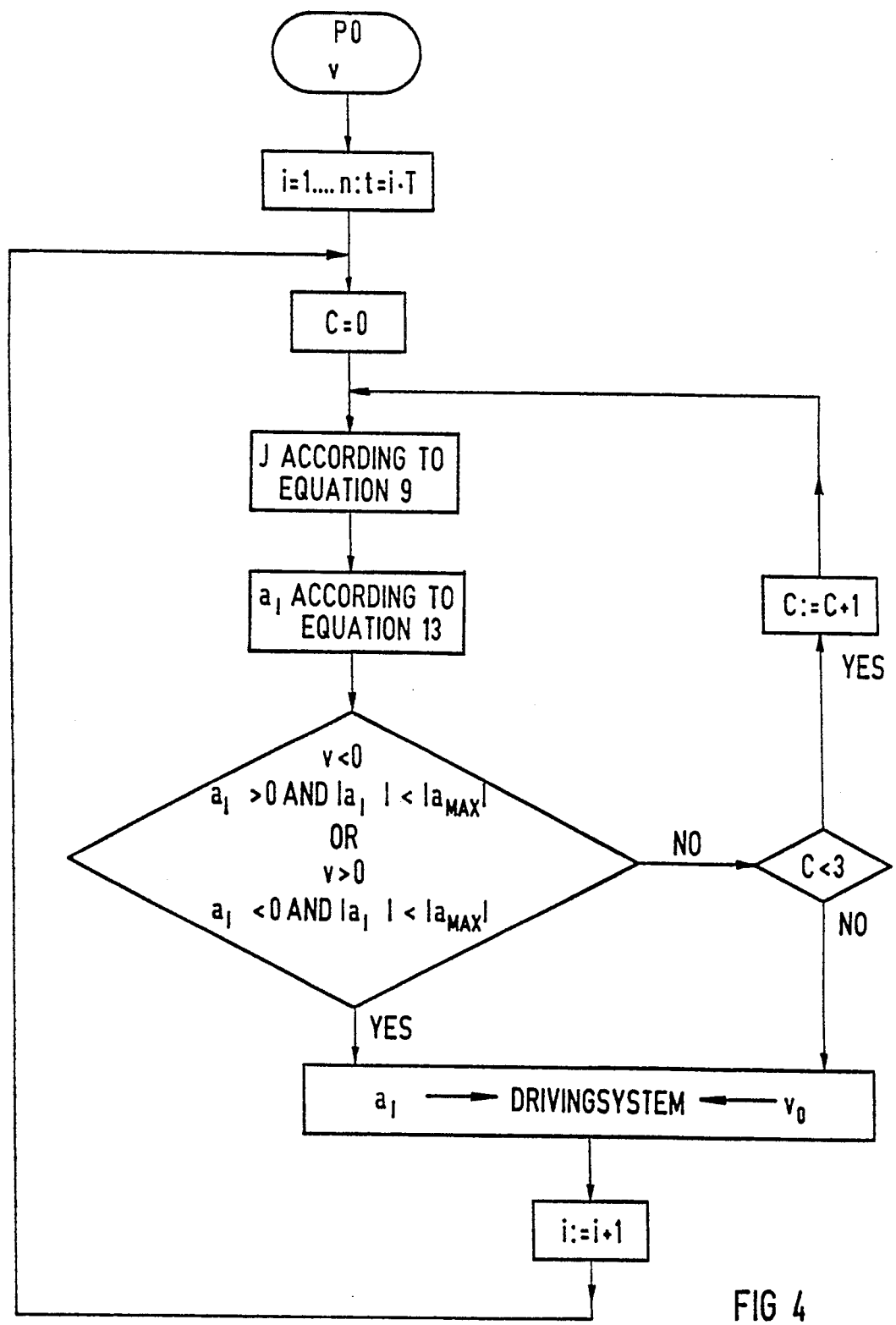
FIG. 4 is a flow chart.

The flow chart of FIG. 4 clarifies the steps to be implemented by the numerical control with reference to the above equations.

In a first step, the target point P0 and the final velocity $v_{END}$, at which the target point P0 is supposed to be reached, are transferred to the numerical control. The following process steps are implemented at every calibration time $i \cdot T$, where the counting variable i runs from 1 to n. First, the constant C=0 is set; then J is defined according to equation 9 with this constant. After J is defined, the approach acceleration $a_1$ can be calculated according to equation 13. In the case of positive travel, that is when v is less than 0, one tests if the approach acceleration $a_1$ is greater than 0 and if the magnitude of the approach acceleration $|a_1|$ is less than the magnitude of the maximum acceleration $|a_{MAX}|$. If there is negative travel, that is when the velocity v is greater than 0, one tests if the approach acceleration $a_1$ is less than 0 and if the magnitude of the approach acceleration $|a_1|$ is less than the magnitude of the maximum acceleration $|a_{MAX}|$. If one of these conditions if fulfilled, then the approach acceleration $a_1$ is applied to the driving system. If neither of the two conditions if fulfilled, then, as long as C is smaller than 3, the constant C is incremented by the value "one" and the steps are repeated. If the conditions are not fulfilled for the value C=2, then the constant velocity $v_0$ will continue to be applied to the driving system. These steps are then repeated until the target point P0 is reached with the approach velocity $v_{END}$.

At this point, it should again be mentioned explicitly that it is not necessary to calculate the acceleration a from the approach acceleration $a_1$, whereby this acceleration a is the acceleration with which the target point P0 is finally reached with the final velocity $v_{END}$. When, as described, the approach acceleration $a_1$ is calculated at every calibration time T according to the indicated equation 13, then it is automatically guaranteed that the target point P0 is reached at a calibration time T.

To ensure that the driving system does not experience any sudden changes as a result of the acceleration changes $a_1$, a rate-of-change limitation can be provided. Such a rate-of-change limitation can be achieved for example by filtering the acceleration values to round off the edges of a particular acceleration pulse so that the new acceleration value is reached gradually.

A rate-of-change limitation by means of a filter based on a discrete convolution is explained in greater detail in the following.

Employing equations 9 and 13, a sequence of velocity settings v(k) are generated for an arbitrary path from $s_1$ to $s_2$. The position $s_1$ is able to be expressed, in accordance with the following equation, as a linear combination of the individual velocity settings:

$$s_1 = s_0 + \sum_{k=0}^{m} v_{(k-1)} \cdot T + \frac{1}{2}[v_{(k)} - v_{(k-1)}] \cdot T$$

$$= s_0 + \sum_{k=0}^{m} \frac{1}{2}[v_{(k)} + v_{(k-1)}] \cdot T$$

Equation 14

The position $s_1$ is likewise reached on the basis of the linearity, when instead of the sequence v(k), the sequence $v_r(k)$ is specified. One obtains the sequence $v_r(k)$ from v(k) by generating the mean using a sliding window of the width $T_M = M \cdot T$, when the filter has a unity steady state gain, and the impulse response $$g(k) = \begin{cases} 1/M & \text{for } k \text{ smaller than } M; \\ 0 & \text{otherwise} \end{cases}$$

Equation 15

Therefore, a maximum rate-of-change results, in other words the derivation of the acceleration $$r_{MAX} \leq 1/T_M \cdot a_{MAX}$$

Equation 16

For medium and small paths, exact positioning without overshoot is still guaranteed. The rate-of-change can then increase to the value $$r_{MAX} \leq 2/T_M \cdot a_{MAX}.$$

Equation 17

If necessary, the mean value for small paths must therefore be generated with double the window width ($T_M$).

Figure 5:
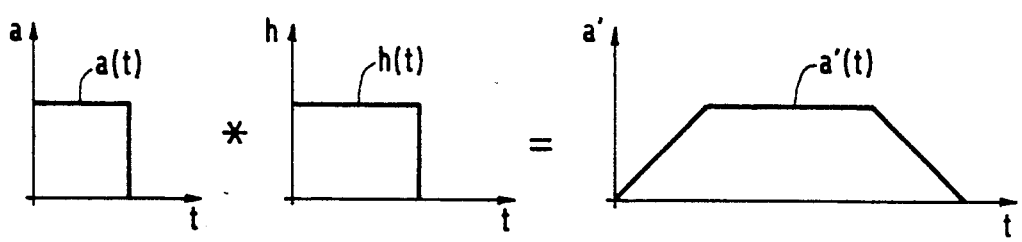
FIG. 5 is a diagram of the formation of a rate-of-change limited acceleration operation.

The described rate-of-change limitation by means of the pulse filter corresponds to a discrete convolution which is illustrated, for reasons of simplicity, for the continuous case in FIG. 5. The acceleration a(t) within one calibration interval is convolved with the transfer function h(t) by the filter. The result of the convolution a'(t) shows that the resulting acceleration no longer increases abruptly, but rather in a continuous fashion. The convolution relation for the continuous case is:

$$a'(t) = a(t) * h(t) = \int_0^\infty a(t) \cdot h(\tau - t) d\tau$$

Equation 18

What is claimed is:

1. A method for the numerical positioning of driving systems to reach a target point (P0) with a predetermined final velocity ($v_{END}$) comprising the steps of:
   a) successively approaching predetermined positions, which lie on at least a one-dimensional path of motion;
   b) determining an approach acceleration ($a_1$) for a first calibration time ((k−1)·T), which occurs before a minimum time ($t_{MIN}$), wherein the minimum time ($t_{MIN}$) is a time required to reach the target point (P0) with the final velocity ($v_{END}$) when employing a maximum acceleration ($a_{MAX}$);
   c) applying said approach acceleration ($a_1$) to the driving system up to a second calibration time (k·T);
   d) determining a final acceleration (a) for the second calibration time (k·T);
   e) applying said final acceleration (a) to the driving system until the target point (P0) is reached; and
   f) selecting said approach acceleration ($a_1$) and final acceleration (a) to reach the target point (P0) with the final velocity ($v_{END}$) exactly at an integral multiple of the calibration time (n·T).

2. A method for the numerical positioning of motorized driving systems to reach a target point (P0) with a predetermined final velocity ($v_{END}$) comprising the steps of:
   a) successively approaching predetermined positions, which lie on at least a one-dimensional path of motion;
   b) determining a first approach acceleration for a first calibration time ((k−1)·T), which occurs before a minimum time ($t_{MIN}$), wherein the minimum time ($t_{MIN}$) is a time required to reach the target point (P0) with the final velocity ($v_{END}$) when employing a maximum acceleration ($a_{MAX}$);

c) determining an additional approach acceleration ($a_1(k \cdot T)$) for each additional calibration time ($k \cdot T$);

c) applying said additional approach acceleration ($a_1(k-1) \cdot T, a_1(k \cdot T)$) to the driving system at a corresponding calibration time ($(k-1) \cdot T, k \cdot T$); and d) selecting each additional approach acceleration ($a_1(k-1), a_1(k)$) so that at a respective additional calibration time ($k \cdot T$), a remaining residual path ($s(k)$) can be covered with an acceleration (a) during a time span ($n \cdot T$) which corresponds to an integral multiple of the calibration time.

3. The method according to claim 1, further comprising the steps of:

a) calculating an integer (J) at said first and second calibration time ($(k-1)T, K \cdot T$), according to an Equation I as follows:

$$J = \text{integer } ((v_0 - v_{END})/(a_{MAX} \cdot T)) + C \qquad \text{Equation I}$$

in which $C = 0, 1, 2$, and $v_0$ is an initial velocity of the driving system at a first calibration time ($(k-1) \cdot T$);

b) calculating an approach acceleration at said first and second calibration times ($(k-1) \cdot T, k \cdot T$), according to an equation II as follows:

$$a_1 = \frac{2s(k-1) - (J+2) \cdot T \cdot v_0 - J \cdot T \cdot v_{END}}{(J+1) \cdot T^2} \qquad \text{EQUATION II}$$

in which $s(k-1)$ is a remaining path up to the target point (P0);

c) checking a first and second condition indicated in an equation III and an equation IV after said calculation of said approach acceleration ($a_1$) as follows:

for $v < 0$: $a_1 > 0$ and $|a_1| < |a_{MAX}|$ \qquad Equation III for $V > 0$: $a_1 < 0$ and $|a_1| < |a_{MAX}|$ \qquad Equation IV d) incrementing a value of C and repeating steps a) through c) if neither the first nor the second condition mentioned in step c) is fulfilled and C is less than two;

e) retaining previous parameters of the driving system up to a next calibration time if neither the first nor the second condition mentioned in step c) is fulfilled and C equals two;

f) applying the approach acceleration ($a_1$) to the driving system up to the next calibration time, if either the first or the second condition mentioned in step c) in fulfilled; and g) applying the final acceleration (a) to the driving system at the next calibration time, whereby the final acceleration (a) is defined according to an equation V as follows:

$$a = (v_0 + a_1 \cdot T - v_{END})/(J \cdot T) \qquad \text{Equation V}$$

4. The method according to claim 2, further comprising the steps of:

a) calculating an integer (J) at said first and second calibration time ($(k-1)T, K \cdot T$), according to an Equation I as follows:

$$J = \text{integer } ((v_0 - v_{END})/(a_{MAX} \cdot T)) + C \qquad \text{Equation I}$$

in which $C = 0, 1, 2$, and $v_0$ is an initial velocity of the driving system at a first calibration time ($(k-1) \cdot T$);

b) calculating an approach acceleration at said first and second calibration times ($(k-1) \cdot T, k \cdot T$), according to an equation II as follows:

$$a_1 = \frac{2s(k-1) - (J+2) \cdot T \cdot v_0 - J \cdot T \cdot v_{END}}{(J+1) \cdot T^2} \qquad \text{EQUATION II}$$

in which $s(k-1)$ is a remaining path up to the target point (P0);

c) checking a first and second condition indicated in an equation III and an equation IV after said calculation of said approach acceleration ($a_1$) with equations III and IV as follows:

for $v < 0$: $a_1 > 0$ and $|a_1| < |a_{MAX}|$ \qquad Equation III for $v > 0$: $a_1 < 0$ and $|a_1| < |a_{MAX}|$ \qquad Equation IV d) incrementing a value of C and repeating steps a) through c) if neither the first nor the second condition mentioned in step c) is fulfilled and C is less than two;

e) retaining previous parameters of the driving system up to a next calibration time if neither the first nor the second condition mentioned in step c) is fulfilled and C equals two;

f) applying the approach acceleration ($a_1$) to the driving system up to the next calibration time, if either the first or the second condition mentioned in step c) in fulfilled; and g) repeating steps a) to f) at every following calibration time.

5. The method according to claim 1, wherein said approach acceleration comprises an approach acceleration pulse with edges, and said final acceleration comprises a final acceleration pulse with edges, and further comprising the step of rounding off the edges of the approach and final acceleration pulses.

6. The method according to claim 2, wherein said approach acceleration comprises an approach acceleration pulse with edges, and said final acceleration comprises a final acceleration pulse with edges, and further comprising the step of rounding off the edges of the approach and final acceleration pulses.

7. The method according to claim 3, wherein said approach acceleration comprises an approach acceleration pulse with edges, and said final acceleration comprises a final acceleration pulse with edges, and further comprising the step of rounding off the edges of the approach and final acceleration pulses.

8. The method according to claim 4, wherein said approach acceleration comprises an approach acceleration pulse with edges, and said final acceleration comprises a final acceleration pulse with edges, and further comprising the step of rounding off the edges of the approach and final acceleration pulses.

9. The method according to claim 1, further comprising the step of filtering the approach and final acceleration ($a_1$, a) with a pulse filter having a unity steady state and a pulse width that is a multiple of the calibration time (T), before applying the approach and final acceleration ($a_1$; a) to the driving system.

10. The method according to claim 2, further comprising the step of filtering the approach and final acceleration ($a_1$, a) with a pulse filter having a unity steady state and a pulse width that is a multiple of the calibration time (T), before applying the approach and final acceleration ($a_1$, a) to the driving system.

11. The method according to claim 3, further comprising the step of filtering the approach and final acceleration ($a_1$, a) with a pulse filter having a unity steady state and a pulse width that is a multiple of the calibration time (T), before applying the approach and final acceleration ($a_1$, a) to the driving system.

12. The method according to claim 4, further comprising the step of filtering the approach and final acceleration ($a_1$, a) with a pulse filter having a unity steady state and a pulse width that is a multiple of the calibration time (T), before applying the approach and final acceleration ($a_1$, a) to the driving system.

* * * * *